(12) United States Patent
Glimcher

(10) Patent No.: US 11,940,917 B2
(45) Date of Patent: Mar. 26, 2024

(54) SYSTEM AND METHOD FOR NETWORK INTERFACE CONTROLLER BASED DISTRIBUTED CACHE

(71) Applicant: Dell Products L.P., Round Rock, TX (US)

(72) Inventor: Boris Glimcher, Tel Aviv-Jaffa (IL)

(73) Assignee: Dell Products L.P., Round Rock, TX (US)

(*) Notice: Subject to any disclaimer, the term of this patent is extended or adjusted under 35 U.S.C. 154(b) by 113 days.

(21) Appl. No.: 17/862,709

(22) Filed: Jul. 12, 2022

(65) Prior Publication Data

US 2024/0020233 A1  Jan. 18, 2024

(51) Int. Cl.
*G06F 12/0817* (2016.01)
*G06F 12/0813* (2016.01)
*G06F 12/0891* (2016.01)

(52) U.S. Cl.
CPC ...... *G06F 12/0824* (2013.01); *G06F 12/0813* (2013.01); *G06F 12/0822* (2013.01); *G06F 12/0891* (2013.01)

(58) Field of Classification Search
CPC ............. G06F 12/0813; G06F 12/0822; G06F 12/0824; G06F 12/0891
See application file for complete search history.

(56) References Cited

U.S. PATENT DOCUMENTS 11,481,326 B1* 10/2022 Makam ............... G06F 12/0813
2021/0081312 A1* 3/2021 Coury ................. G06F 12/0813

* cited by examiner

*Primary Examiner* — Aracelis Ruiz
(74) *Attorney, Agent, or Firm* — Womble Bond Dickinson (US) LLP

(57) ABSTRACT

Methods and systems for managing storage of data in a distributed system are disclosed. To manage storage of data in a distributed system, a data processing system may include a network interface controller (NIC). The network interface controller may present emulated storages that may be used for data storage. The emulated storage devices may utilize storage resources of storage devices. The storage devices may be remote to the NIC. To reduce communication bandwidth and/or use of resources of the storage devices, the NIC and/or NICs of other data processing systems may implemented a distributed cache for data stored in the storage devices. The NICs may implement a method of managing the distributed cache to maintain synchronization between the distributed cache and the data stored in the storage devices.

20 Claims, 6 Drawing Sheets

SYSTEM AND METHOD FOR NETWORK INTERFACE CONTROLLER BASED DISTRIBUTED CACHE

FIELD OF THE DISCLOSED EMBODIMENTS

Embodiments disclosed herein relate generally to data storage. More particularly, embodiments disclosed herein relate to systems and methods for network interface controller based caching of data for storages.

BACKGROUND

Computing devices may store data and used stored data. For example, computing devices may utilize data when providing computer implemented services. Different computing devices may perform similar and/or different functions. The components of computing devices may generate data that may be relevant to future operations. The data may be used during the future operations.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
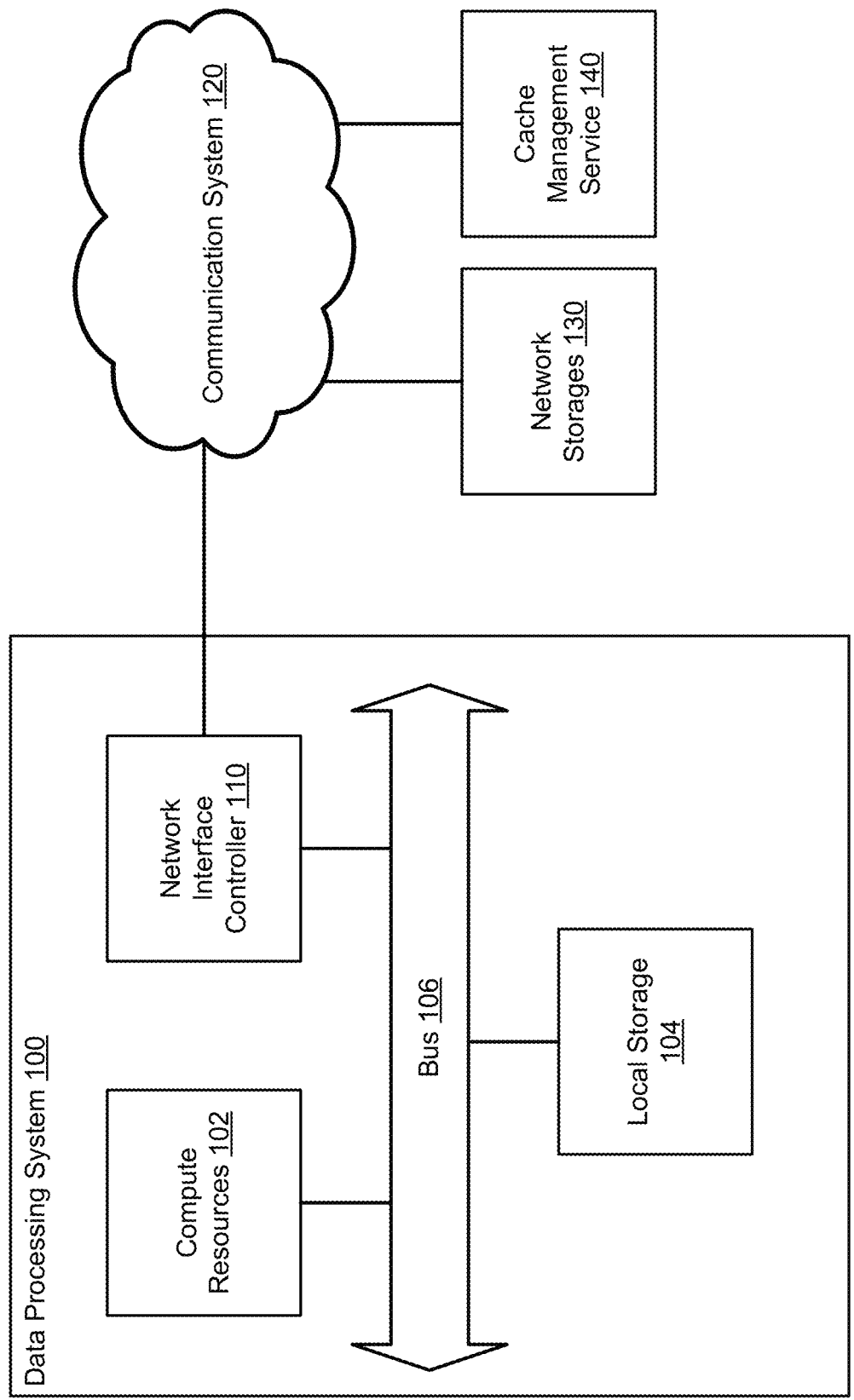
FIG. 1 shows a block diagram illustrating a data processing system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing storage of data in a distributed system. To manage storage of data in a distributed system, a data processing system may include a network interface controller (NIC). The network interface controller may present emulated storages that may be used for data storage. The emulated storage devices may utilize storage resources of storage devices.

The storage devices may be remote to the NIC. To reduce communication bandwidth and/or use of resources of the storage devices, the NIC and/or NICs of other data processing systems may implemented a distributed cache for data stored in the storage devices. The NICs may implement a method of managing the distributed cache to maintain synchronization between the distributed cache and the data stored in the storage devices.

To maintain synchronization, the NICs may, as they modify data stored in the storage devices, both update their hosted portion of the distributed cache and initiate distribution of cache entry invalidation messages to the other NICs. Upon receipt of the messages, the other NICs may invalidate any cache entries of their portions of the distributed cache that are implicated by the cache entry invalidation messages.

By doing so, each of the portions of the distributed cache of the NICs may maintain synchronization with the storage devices while limiting computational overhead (e.g., consumption of computing resources such as communication bandwidth, processing cycles, memory, storage space, etc.) for cache synchronization.

Thus, embodiments disclosed herein may more efficiently marshal limited computing resources of data processing systems for services access requests for data. By doing so, the data processing systems may provide better performance which take the form of reduce time for completion of workloads and/or reduced energy consumption for completion of workloads.

In an embodiment, a computer-implemented method for managing a distributed cache implemented by network inference controllers of data processing systems is disclosed. The distributed cache may provide cache services for data stored in storages that are remote to the data processing systems. The method may include obtaining, by a Network Interface Controller (NIC) of a data processing system of the data processing systems, a read request for a portion of data stored in one of the storages; performing, by the NIC, a lookup for the portion of the data in a portion of the distributed cache hosted by the NIC to obtain a lookup result; in a first instance where the lookup result indicates that the portion of the data is present in the portion of the read cache hosted by the NIC: providing the portion of the data using the portion of the distributed cache to service the read request; in a second instance where the lookup result indicates that the portion of the data is not present in the portion of the read cache hosted by the NIC: providing the portion of the data using the one of the storages to service the read request; and maintaining an accuracy of the portion of the read cache with respect to the portion of the data by processing a cache entry invalidation message originated by a second NIC of a second data processing system of the data processing systems.

Processing the cache entry invalidation message may include identifying a tuple specified by the cache invalidation message; identifying a sub-portion of the portion of the distributed cache based on the tuple; and invalidating a cache entry present in the sub-portion. The cache entry may include a copy of the portion of the data. The tuple may include a volume identifier for the portion of the data; an offset for the portion of the data; and a size of the portion of the data.

Providing the portion of the data using the one of the storages to service the read request may include encapsulating information regarding the read request; transmitting the encapsulated information to the one of the storages via a communication system; receiving, via the communication system, the portion of the data via communication responsive to the transmitted encapsulated information; and providing, via a bus between the NIC and compute resources of the data processing system, the portion of the data to a hardware component of the compute resources.

Providing the portion of the data using the portion of the distributed cache to service the read request may include reading the portion of the data from the portion of the distributed cache; and providing, via the bus between the NIC and compute resources of the data processing system, the portion of the data to the hardware component of the compute resources.

Processing the cache entry invalidation message originated by the second NIC of the second data processing system of the data processing systems may include receiving, via the communication system, the cache entry invalidation message from the second NIC or a cache management service.

The distributed cache may not be persistent, and respective portions of the distributed cache hosted by the data processing systems are refreshed when each the data processing systems restarts.

Each of the respective portions of the distributed cache may store copies of portions of the data that are relevant to data processing system that hosts corresponding portions of the distributed cache.

The computer-implemented method may also include obtaining, by the NIC, a data storage request for a second portion of the data; updating, by the NIC, the portion of the distributed cache based on the second portion of the data; providing, by the NIC, the second portion of the data to the storages for storage; and distributing, by the NIC, a second cache entry invalidation message for the second portion of the data to each other data processing system of the data processing systems that does not host the NIC. The second cache entry invalidation message may not include the second portion of the data. The second cache entry invalidation message may include information usable by each other data processing system of the data processing systems to identify cache entries of the distributed cache hosted by each respective data processing system of the data processing systems that no longer accurately reflects the data stored in the storages.

A non-transitory media may include instructions that when executed by a processor cause the computer-implemented method to be performed.

A data processing system may include the non-transitory media and a processor (e.g., of a NIC), and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include to data processing system 100.

To perform the workloads, data processing system 100 may provide computer implemented services to users and/or other computing devices operably connected to data processing system 100. The computer implemented services may include any type and quantity of services including, for example, database services, instant messaging services, video conferencing services, etc. Different systems may provide similar and/or different computer implemented services.

To provide the computer implemented services, data processing system 100 may include various hardware resources such as compute resources 102, local storage 104, network interface controller (NIC) 110, and bus 106. Compute resources 102 may include hardware devices such as processors, memory modules, etc. Local storage 104 may include storage devices such as hard disk drives, solid state drives, storage controller, etc. NIC 110 may facilitate communication with other remote devices. For example, NIC 110 may facilitate communication with network storages 130, cache management service 140, and/or other data processing systems (not shown) that may include network interface controllers. Any of the components of data processing system 100 may be operably connected to one another and/or other components (not shown) via bus 106.

When providing the computer implemented services, data may be stored for future use in local storage 104 and/or remote storage devices such as network storages 130 (and/or other remote storages). To facilitate use of network storages 130 (and/or other remote or local storages), NIC 110 may present an emulated storage (e.g., by presenting an emulated storage endpoint) to compute resources 102 via bus 106. Consequently, compute resources 102 may direct access requests (e.g., storage, read, delete) for the emulated storage to NIC 110 via bus 106. From the perspective of compute resources 102, the emulated storage may be a local device.

To implement the emulated storage, NIC 110 may use the storage resources of network storages 130 (and/or other remote or local storage devices operably connected to it). For example, network storages 130 may also include a NIC (not shown) that may include functionality to secure, format, and use storage resources local to network storages 130. When an access request (read, write, delete, etc. request) for the emulated storage is received by NIC 110, NIC 110 may use translation tables, lookup tables, and/or implement various procedures for servicing the access request via network storages 130 and/or other storage devices. However, from the perspective of compute resources 102, the emulated storage may appear to be a bare metal device operably connected to compute resources 102 via bus 106. Compute resources 102 may be unaware of network storages 130 and/or the processes performed by NIC 110 to service access requests.

In general, embodiments disclosed herein relate to systems, methods, and devices for managing data storage in a distributed system. To manage data storage in a data processing system, NIC 110 and/or NICs hosted by other data processing systems may implement a distribute cache for data stored in network storages 130. The portions of the distributed cache hosted by the NICs may be used to reduce communications with and/or use of network storages 130 for servicing access requests for data stored network storages 130.

For example, the portion of the distributed cache hosted by NIC 110 may include copies (e.g., "cached data") of portions of the data stored in network storage 130. When an access request for the data stored in network storages 130 is obtained by NIC 110, NIC 110 may identify whether cached data may be usable to service the access request. If the access request may be serviced using the cached data, the cached data may be used to do so rather than cooperating with network storage 130 to use data stored in network storages 130 to service the access request. By doing so, use of and/or communication with network storages 130 may be reduced.

When cached data may not be used to service access requests, NIC 110 may cooperate with network storages 130 to service these access requests. For example, when a request to modify stored data in network storages 130 is received by NIC 110, NIC 110 may cooperate with network storages 130 to service the data storage request (e.g., by modifying the data in network storages 130 accordingly). However, doing so may place the data stored in the portion of the distributed cached hosted by NIC 110 and/or the data stored in other portions of the distributed cache hosted by other NICs of other data processing systems out of synchronization with the corresponding data in network storages 130. For example, any number of NICs may host portions of the distributed cache that each include copies of a portion of data of network storages 130 that may all become out of synchronization of the portion of the data of network storages 130 is modified.

To maintain synchronization between the data stored in network storages 130 and the distributed cache, NIC 110 may (i) update the portion of the distributed cache that it hosts based on the change that it initiated with respect to the data stored in network storages 130 and (ii) initiate distribution of cache entry invalidation messages to other NICs. The cache entry invalidation messages distributed to the other NICs may allow the other NICs to identify portions (e.g., cache entries, any number) of their respectively hosted portions of the distributed cache that are out of synchronization with the data stored in network storages 130.

NIC 110 may initiate distribution of the cache entry invalidation messages by (i) sending the cache entry invalidation messages and/or (ii) using cache management service 140 to send the cache entry invalidation messages. While illustrated as being separate from network storages 130, the functionality of network storages 130 and cache management service 140 may be performed by a single system without departing from embodiments disclosed herein.

When a NIC receives a cache entry invalidation message, the NIC may remove, nullify, or otherwise document that a portion (e.g., one or more cache entries) of the distributed cache hosted by the NIC is no longer in synchronization with the data stored in network storages 130. For example, the NIC may remove one or more cache entries from its portion of the distributed cache. By doing so, the data in the updated portion of the distributed cache may be returned to synchronization with the data in network storages 130. If an access request that was previously serviceable using the now-removed entries is obtained by the NIC, then the NIC may cooperate with network storages 130 to obtain the data necessary to service the access request and may add a cache entry.

The portion of the distributed cache hosted by NIC 110 may be limited in size and may only include cache data corresponding to a portion of the data stored in network storages 130. NIC 110 may implement any method for managing the contents of the portion of the distributed cache such as a least recently used method of selecting cache entries for eviction, a least relevant entry method for cache eviction, and/or other methods for selection of entries for cache eviction when the portion of the distributed cache has insufficient resources for adding new cache entries.

The portion of the distributed cache hosted by each respective NIC may not be resilient, and may be emptied when NIC 110 restarts. Upon restart, the portion of the distributed cache hosted by NIC 110 may be refilled with entries based on subsequently encountered access requests. Generally, the contents of the portion of the distributed cache may be filled based on access requests received by each NIC. Consequently, the portion of the distributed cache hosted by each NIC may be unique to each NIC (but may be similar if similar NICs encounter similar access requests for similar portions of the data stored in network storages 130).

The portion of the distributed cache hosted by NIC 110 (and/or other NICs), may be implemented with an in-memory data structure. The in-memory data structure may be implemented using, for example, a lookup data structure, a table a database, or other type of data structure. The in-memory data structure may be keyed to identifiers of volumes (of data) stored in network storages 130, and/or logical block addresses (LBAs) within the volumes. Consequently, when a tuple such as <Volume Identifier, Logical Block Address, Size> are obtained from access requests, a lookup for a copy of the implicated portion of data stored in network storages 130 may be performed in the portion of the distributed cache hosted by NIC 110. The lookup may return the copy of the implicated portion of data (if previously cached resulting in a cache hit) or may not return any data (if not previously cached resulting in a cache miss).

NIC 110 may be implemented with a hardware devices and/or software components hosted by the hardware devices. In an embodiment, NIC 110 is implemented using a hardware device including circuitry. The hardware device may be, for example, a digital signal processor, a field programmable gate array, system on a chip, or an application specific integrated circuit. The circuitry may be adapted to cause the hardware device to perform the functionality of NIC 110. NIC 110 may be implemented using other types of hardware devices without departing embodiments disclosed herein.

In one embodiment, NIC 110 is implemented using a processor adapted to execute computing code stored on a persistent storage that when executed by the processor performs the functionality of NIC 110 discussed throughout this application. The processor may be a hardware processor including circuitry such as, for example, a central processing unit, a processing core, a part of a system on a chip or other type of special purpose hardware device, or a microcontroller. The processor may be other types of hardware devices for processing information without departing embodiments disclosed herein.

Generally, NIC 110 may include functionality to process network data units such as packets. Packets may be exchanged with communication system 120, and devices operably connected to communication system 120 such as network storages 130, cache management service 140, other NICs, and/or other entities (not shown). The communications between NIC 110 and network storages 130 may be encapsulated to obtain packets (or other communication protocol compliant data structures), and directed between network storages 130 and NIC 110 via communication system 120.

NIC 110 may be implemented with and/or perform the functions of various types devices such as data processing units (e.g., portions of a chip or a system on a chip), infrastructure processing units, smart network interface controllers. These devices may generally be programmable, facilitate communications with other components, include accelerator cores or other components for speeding the performance of certain functions such as cryptography, and/or may generally include configurable units to perform a broad array of functions through configuration.

Bus 106 may be implemented with one or more communication buses. The communications buses may support various communications standards. In an embodiment, bus 106 comprises a Peripheral Component Interconnect Express (PCIE) bus which connects compute resources 102 to NIC 110. NIC 110 may comply with the Non-Volatile Memory Express (NVMe) specification and support NVME communications.

NIC 110 may also support, NVME over fabric (NVMe-oF) communications (or other communication standards) and may communicate with network storages 130 and/or other local storage devices using NVMe-oF communications.

To support NVMe communications, NIC 110 may include functionality to present endpoints (e.g., addressable locations presented to other devices), establish initiators to facilitate communications between endpoints and the initiators, and/or implement other methods for communicating via bus 106, communication system 120, and/or other communications facilitates not illustrated in FIG. 1.

Figure 2:
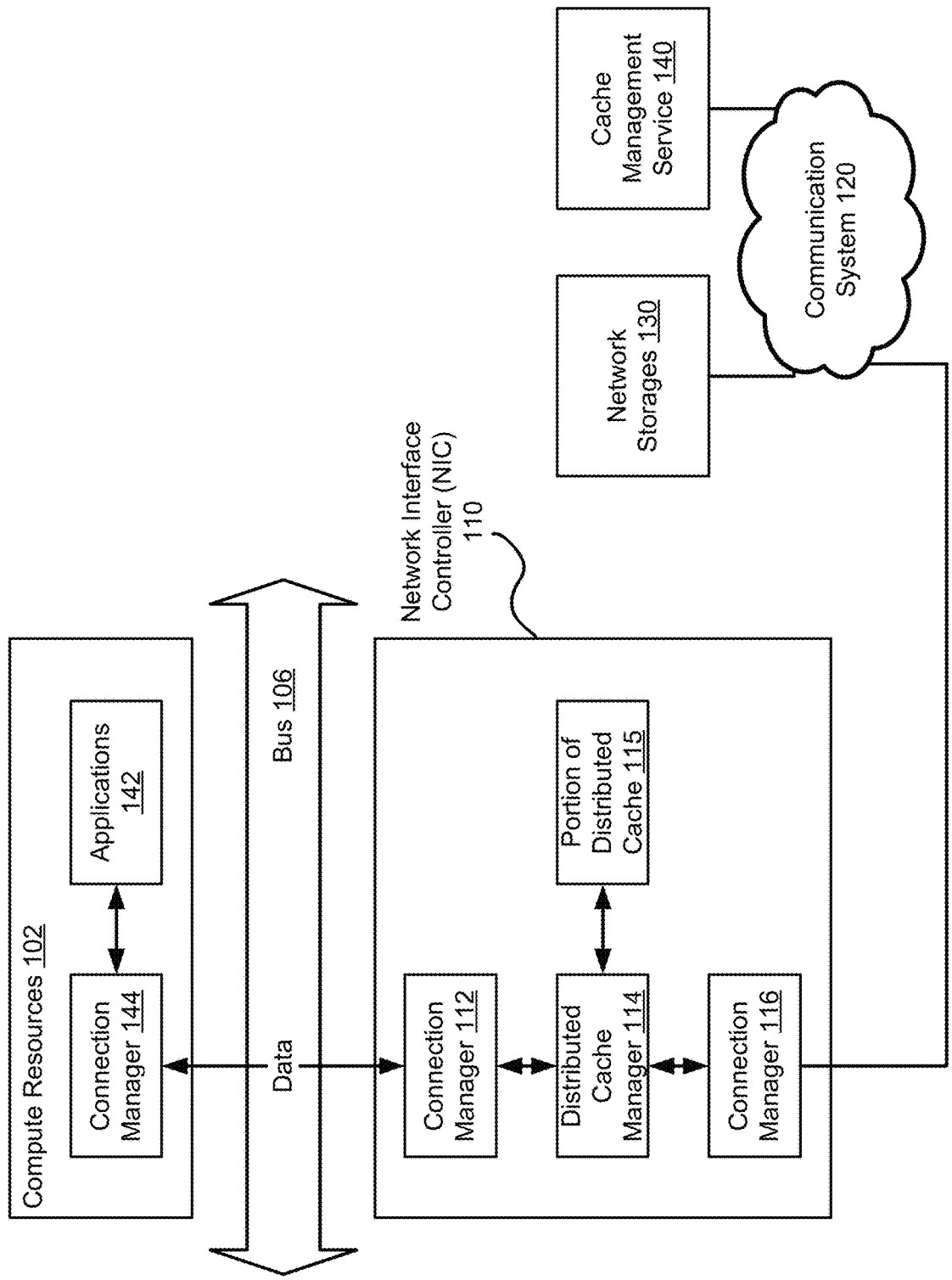
FIG. 2 shows a block diagram illustrating a network interface controller in accordance with an embodiment.

Refer to FIG. 2 for additional details regarding NIC 110.

Network storages 130 may be implemented using, for example, any number of network attached storage systems (e.g., storage arrays). The network attached storage systems may store data for various emulated storages presented by NIC 110.

In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol). Communication system 120 may include packetized communication.

To convey information via communication system 120, data structures (e.g., payloads) may be encapsulated (e.g., packetized) with control information compliant with the communication schemes supported by communication system 120. For example, communication system 120 may include the Internet and support internet protocol communications.

Any of data processing system 100, NIC 110, network storages 130, and cache management service 140 may be implemented with a computing device such as a host or server, a personal computer (e.g., desktops, laptops, and tablets), a "thin" client, a personal digital assistant (PDA), a Web enabled appliance, embedded computing device such as a system on a chip, a mobile phone (e.g., Smartphone), and/or any other type of computing device or system. For additional details regarding computing devices, refer to FIG. 4.

While illustrated in FIG. 1 as including a limited number of specific components, a system in accordance with an embodiment may include fewer, additional, and/or different components than those illustrated therein.

As discussed above, NIC 110 may service access requests using a distributed cache. Turning to FIG. 2, a diagram of NIC 110 in accordance with an embodiment is shown. As discussed above, data processing system 100 may utilize NIC 110 for data storage purposes. To do so, NIC 110 may communicate with computer resources 102 via bus 106, and may communicate with network storages 130, cache management service 140, and/or other components such as other NICs hosted by other data processing systems.

To communicate with NIC 110, compute resources 102 may host connection manager 144. Connection manager 144 may generate access requests (e.g., data read, data write, data deletion, etc.) based on requests from applications 142 (and/or other entities hosted by compute resources 102), encapsulate the access requests as necessary to comply with the communication scheme supported by bus 106, and transmit the encapsulated access request to an emulated storage device endpoint presented by NIC 110. In the context of data storage, the access request may include the data to be stored in the emulated storage.

Connection manager 144, in the context of NVMe communications, may be implemented with an NVMe initiator. The NVMe initiator may be implemented with a driver or other piece of software for sending communications via bus 106. Applications 142 and connection manager 144 may execute via compute resources 102. While not shown in FIG. 2, compute resources 102 may host an operating system, abstraction layers such as virtualization or drivers, and/or other components (e.g., any of which may include connection manager 144) that mediates presentation of storage to applications 142. Connection manager 144 may be implemented differently to conform to different type of communications without departing from embodiments disclosed herein. Applications 142 may provide (all or a portion) the computer-implemented services provided by a data processing system.

To present the emulated storage device endpoint to compute resources 102, NIC 110 may host connection manager 112. Connection manager 112 may present emulated storage device endpoints to other devices, such as data processing system 100. Connection manager 112 may present any number of such emulated endpoints. By doing so, NIC 110 may present any number of emulated storage devices to the compute resources of data processing system 100 and thereby allow for data from the compute resources to be transmitted to NIC 110, which may in turn store the data in other devices.

When communications are received by connection manager 112, the connection manager may identify a target emulated storage and initiate processing of the access requests based on the target. For example, connection manager 112 may pass the access requests to distributed cache manager 114 which may handle processing of the access requests. The access requests may be processed in different manners depending on which a cache hits are obtained using portion of distributed cache 115. As discussed above, the access requests may be serviced using information in portion of distributed cache 115 (if available) or cooperatively with network storages 130.

Distributed cache manager 114 may also generate and process cache entry invalidation messages, as discussed above.

To cooperatively service access requests with network storages 130, distributed cache manager 114 may provide these access requests to connection manager 116. Connection manager 116 may facilitate communications with network storages 130 and/or cache management service 140.

Connection manager 116 may be implemented with, for example, a PCIe initiator, NVMe-oF initiator, and/or other communication protocol compliant initiators to facilitate communications between NIC 110 and storage devices (e.g., 130) and/or other devices. Any of connection manager 112 and connection manager 116 may be implemented with, for example, a driver or other type of application.

In an embodiment, bus 106 is implemented using a PCIe bus. In such a scenario, the functionality of connection manager 112 may be implemented using a PCIe chipset hosted by NIC 110. The chipset may support both physical and virtual functions. The virtual functions may be used to manage presentation of any number of emulated storage devices. The physical and virtual functions may handle protocol specific requirements such as error handling, doorbells, interrupts, and/or other aspects of sending and receiving information via a physical bus.

In an embodiment, any of connection manager 112, distributed cache manager 114, and connection manager 116 is implemented using a hardware device including circuitry. The hardware device may be, for example, a digital signal processor, a field programmable gate array, system on a chip, or an application specific integrated circuit. The circuitry may be adapted to cause the hardware device to perform the functionality of connection manager 112, distributed cache manager 114, and/or connection manager 116. Connection manager 112, distributed cache manager 114, and/or connection manager 116 may be implemented using other types of hardware devices without departing embodiment disclosed herein.

In one embodiment, any of connection manager 112, distributed cache manager 114, and connection manager 116 is implemented using a processor adapted to execute computing code stored on a persistent storage that when executed by the processor performs the functionality of connection manager 112, distributed cache manager 114, and/or connection manager 116 discussed throughout this application. The processor may be a hardware processor including circuitry such as, for example, a central processing unit, a processing core, or a microcontroller. The processor may be other types of hardware devices for processing information without departing embodiment disclosed herein.

Figure 3A:
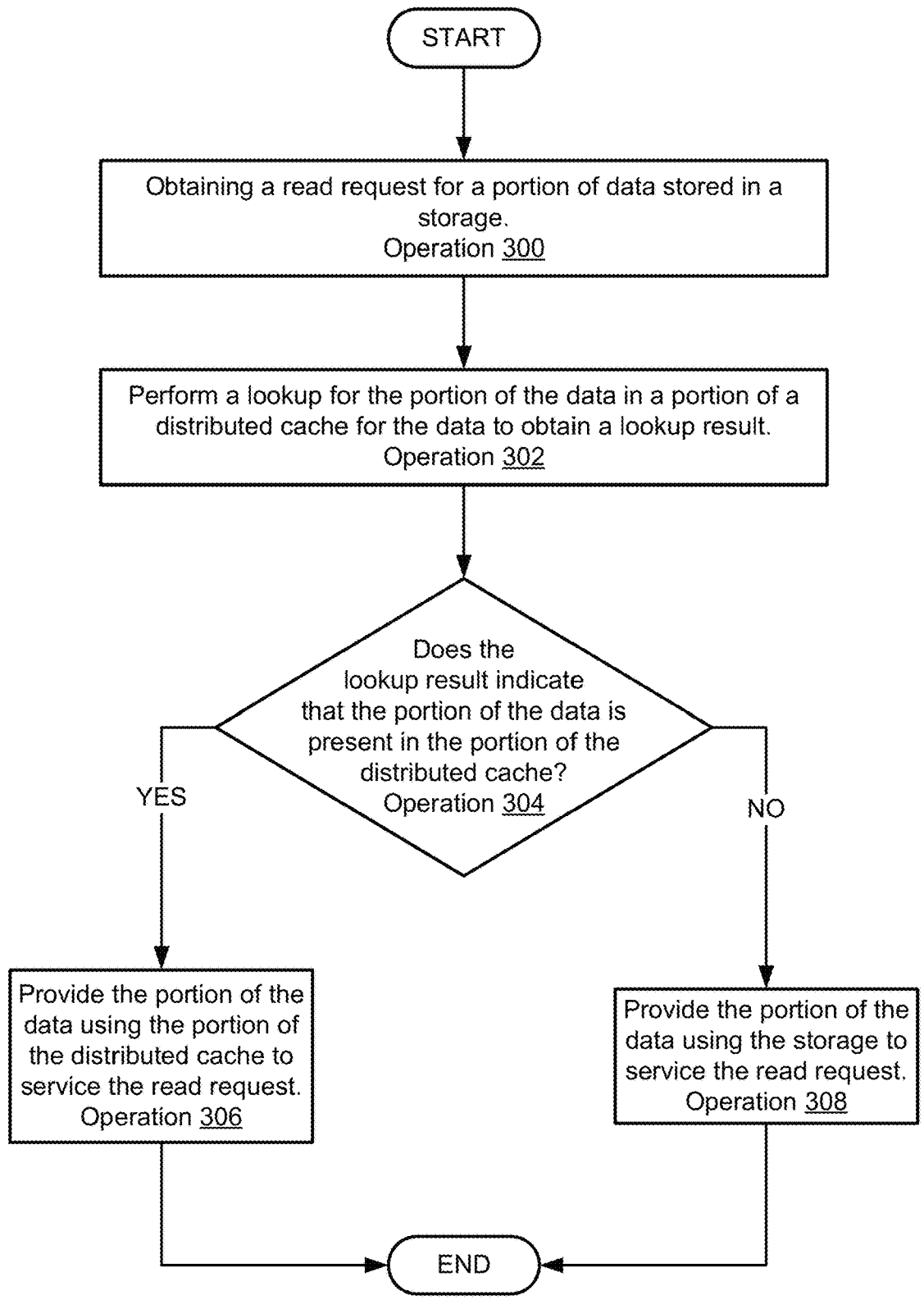
FIG. 3A shows a flow diagram illustrating a method of managing access requests in accordance with an embodiment.
Figure 3B:
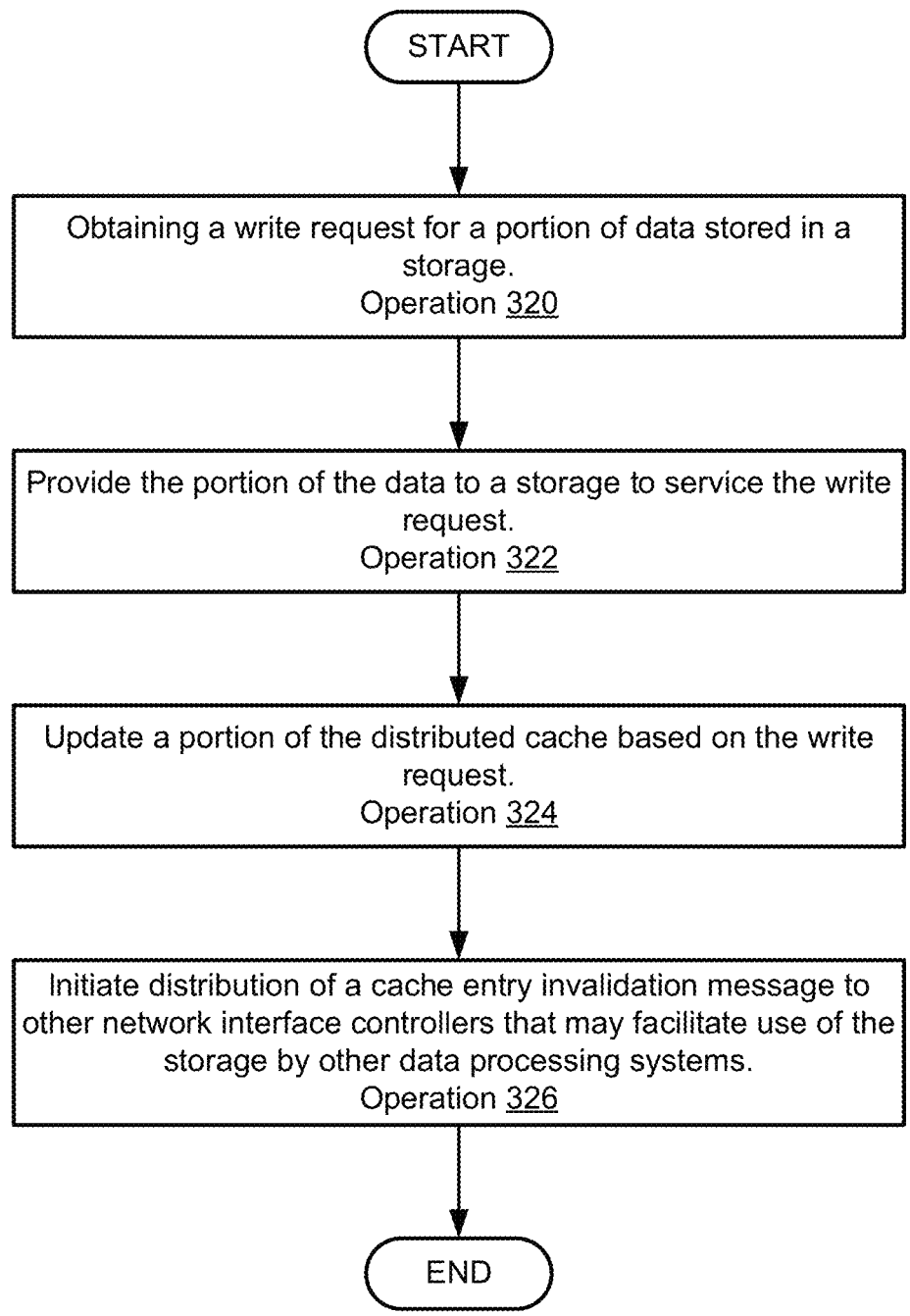
FIG. 3B shows a flow diagram illustrating a method of servicing read requests in accordance with an embodiment.
Figure 3C:
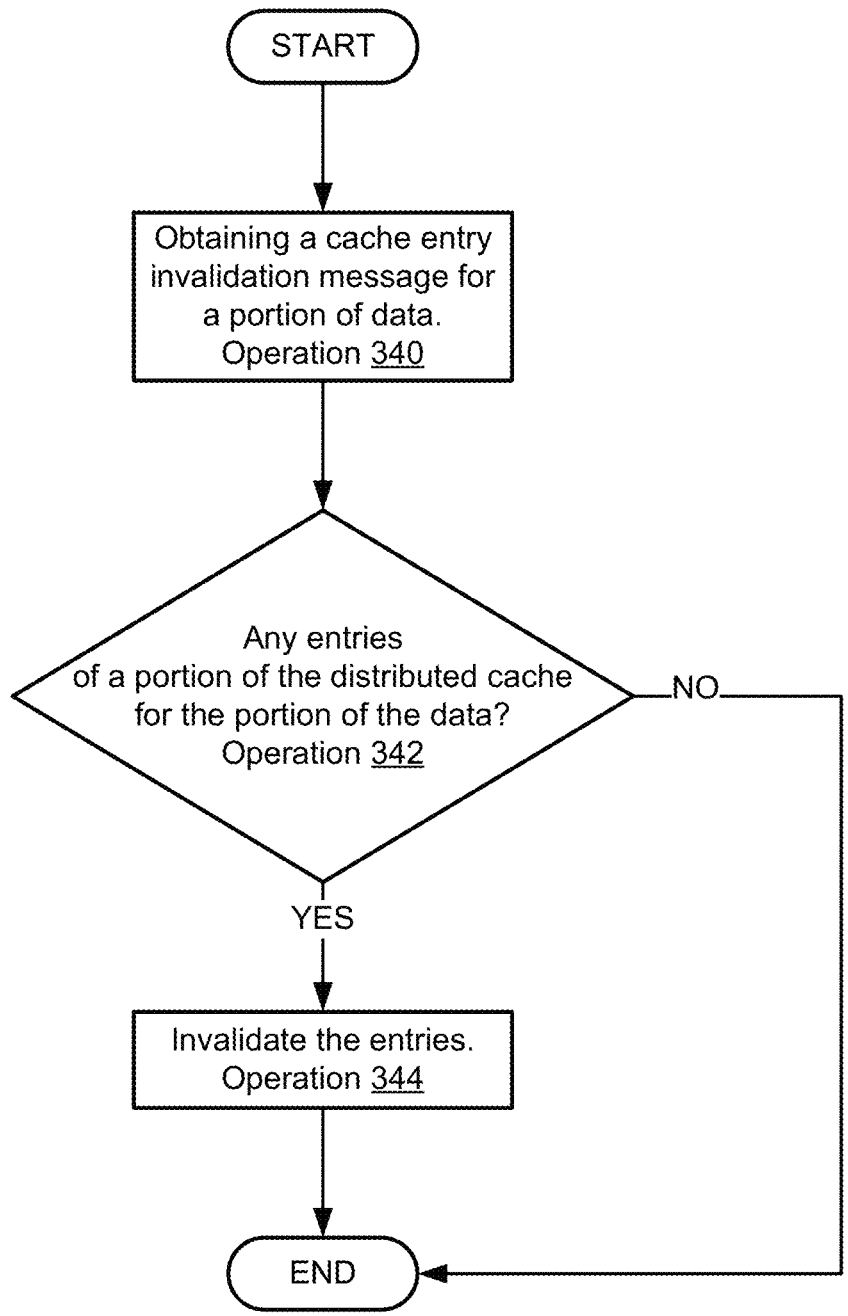
FIG. 3C shows a flow diagram illustrating a method of servicing cache entry invalidation messages in accordance with an embodiment.

Connection manager 112, distributed cache manager 114, and/or connection manager 116 may perform all, or a portion, of the methods illustrated in FIGS. 3A-3C.

Portion of distributed cache 115 may be implemented using memory of NIC 110. A data structure for portion of distributed cache 115 may be stored in the portion of the memory.

While illustrated in FIG. 2 with a limited number of specific components, a NIC may include additional, fewer, and/or different components without departing from embodiments disclosed herein.

As discussed above, the components of FIG. 1 may perform various methods to process access requests. FIGS. 3A-3C illustrate examples of methods that may be performed by the components of FIG. 1 when providing their functionalities. In the diagrams discussed below and shown in FIGS. 3A-3C, any of the operations may be repeated, performed in different orders, and/or performed in a parallel with other operations and/or a partially overlapping in time manner with other operations.

Turning to FIG. 3A, a flow diagram illustrating a method of processing access requests in accordance with an embodiment is shown. The method may be performed by a NIC, a data processing system, a storage, a cache management service, and/or other components.

Prior to operation 300, a cache of a NIC hosted by a data processing system may be populated through processing of any number of access requests.

At operation 300, a read request for a portion of data stored in storage may be obtained. The storage may be remote to the NIC and accessible via a communication system.

The read request may be obtained by receive it from compute resources, from reading it from storage or memory, and/or via other methods. The read request may indicate that a portion of data stored in the remote network (e.g., a network storage) is to be provided to the requestor.

At operation 302, a lookup, for the portion of the data, in the portion of the distributed cache for the data is performed to obtain a lookup result. The lookup may be performed using identifiers included or otherwise indicated by the read request. For example, the access request may include a tuple, as discussed above. The identifiers of the tuple may be used to perform a lookup in the portion of the cache. The lookup result may be the portion of the data if a copy of it is present in the cached data of the portion of the distributed cache, or may indicate that the portion of the data is not included in the cached data.

At operation 304, a determination is made regarding whether the lookup result indicates that the portion of the data is present in the portion of the distributed cache. If the lookup result includes the portion of the data, then it may be determined that the lookup result indicates that the portion of the data is present in the portion of the distributed cache. Otherwise it may be determined that the lookup result does not indicate that the data is present in the portion of the distributed cache.

If it is determined that the portion of the data is present in the portion of the distributed cache, then the method may proceed to operation 306 following operation 304. Otherwise, the method may proceed to operation 308.

At operation 306, the portion of the data is provided using the portion of the distributed cache to service the read request. For example, the portion of the data may be read from the portion of the distributed cache and may be provided by the requestor (e.g., an application hosted by compute resources of a data processing systems).

The method may end following operation 306.

Returning to operation 304, the method may proceed to operation 308 following operation 304 if it is determined that the lookup result does not indicate that the portion of the data is present in the portion of the distributed cache. In other words, following a cache miss.

At operation 308, the portion of the data is provided using the storage to service the read request. The portion of the data may be provided by (i) requesting that the storage provide the portion of the data, (ii) receiving the portion of the data from the storage via a communication responsive to the request, and (iii) providing the portion of the data from the storage to the requestor.

The method may end following operation 308.

Following operation 308, the portion of the distributed cache may be updated. For example, the portion of the data from the storage may be used to update the portion of the distributed cache by adding a new entry. The new entry may be keyed based on the volume identifier, logical block address, size, and/or other information related to storage of the portion of the data in the storage.

Using the method illustrated in FIG. 3A, a system in accordance with an embodiment may reduce computing resource expenditures for servicing access requests for data by eliminating network communications and/or processing by storages. To do so, a distributed cache may need to maintain synchronization with the data for which it caches data. FIGS. 3B-3C illustrate methods that may be performed to maintain distributed cache synchronization.

Turning to FIG. 3B, a flow diagram illustrating a method of processing write requests in accordance with an embodiment is shown. The method may be performed by a NIC, a data processing system, a storage, a cache management service, and/or other components.

At operation 320, a write request for a portion of data stored in a storage is obtained. The write request may be obtained by receiving it from computing resources of a data processing system (e.g., which may host applications that initiated the write request and may use the data to provide computer implemented services). The storage may be remote to the data processing system.

At operation 322, the portion of the data is provided to the storage to service the write request. The portion of the data may be provided to the storage by encapsulating it and sending the encapsulated portion of the data to the storage via a communication system. The storage may write the data once received. The storage may acknowledge the write upon receipt, initiation of writing, and/or completion of writing via acknowledgement messages.

At operation 324, a portion of the distributed cache is updated based on the write request. The portion of the distributed cache may be updated by (i) modifying an existing entry if one of the entries is for data of the storage that is being modified by the write request or (ii) adding a new entry if the write request is for storage of new data rather than modification of already stored data. The modified/new entry may include a copy of the portion of the data indicated by the write request and may be keyed based on volume identified, logical block addresses, and/or other information included in the write request. If the portion of the distributed cache includes insufficient resources, an existing entry may be evicted to make room for the modification to an existing entry or a new entry.

At operation 326, distribution of a cache entry invalidation message to other NICs that may facilitate use of the storage by other data processing systems is initiated. The distribution may be initiated by (i) sending the cache entry invalidation messages to the other NICs, (ii) providing information regarding the cache entry invalidation messages to a cache management services which may in turn send the cache entry invalidation messages to the other NICs, (iii) automatically by the storage which may send the cache entry invalidation messages to the other NICs in response to being provided the portion of the data and writing it, and/or (iv) via other methods.

Distributing the cache entry invalidation message to the other NICs may place the portions of the distributed cache of the other NICs back in synchronization with the storage.

The method may end following operation 326.

Turning to FIG. 3C, a flow diagram illustrating a method of processing cache entry invalidation messages in accordance with an embodiment is shown. The method may be performed by a NIC, a data processing system, a storage, a cache management service, and/or other components.

At operation 340, a cache entry invalidation message for a portion of data is received. The cache entry invalidation message may be obtained by receiving it from another device (e.g., another NIC, a storage, a distributed cache management service, etc.). The cache entry invalidation message may not include the portion of the data, but may include information regarding where the portion of the data is stored in storage. For example, the cache entry invalidation message may include a tuple, as discussed above.

At operation 342, a determination is made regarding whether any entries of a portion of the distributed cache are for the portion of the data. The determination may be made by performing a lookup in the portion of the distributed cache using the information regarding whether the portion of the data is stored in storage. The lookup may either indicate a cache hit or a cache miss. If a cache hit occurs, it may be determined that the hit entries of the portion of the distributed cache are for the portion of the data. Otherwise, it may be determined that none of the entries of the distributed cache are for the portion of the data.

If it is determined that any of the entries are for the portion of the data, then the method may proceed to operation 344. Otherwise the method may end following operation 342. Ending following operation 342 may indicate that the portion of the cache did not cache the portion of the data and, consequently, was not made out of synchronization with data in storage due to a change in the data in the storage made by another NIC.

At operation 344, the (hit) entries of the portion of the distributed cache are invalidated. The entries may be invalidated by removing them or otherwise removing information regarding the portion of the data from the portion of the distributed cache.

The method may end following operation 344.

Using the methods illustrated in FIGS. 3B-3C, embodiments disclosed herein may maintain consistency of portions of a distributed cache as changes are made to corresponding data by any number of entities. By distributing cache entry invalidation message (e.g., without copies of changed data) for cache entry removal, computational overhead for cache consistency may be reduced when compared to modifying cached data to reflect changed corresponding data.

Figure 4:
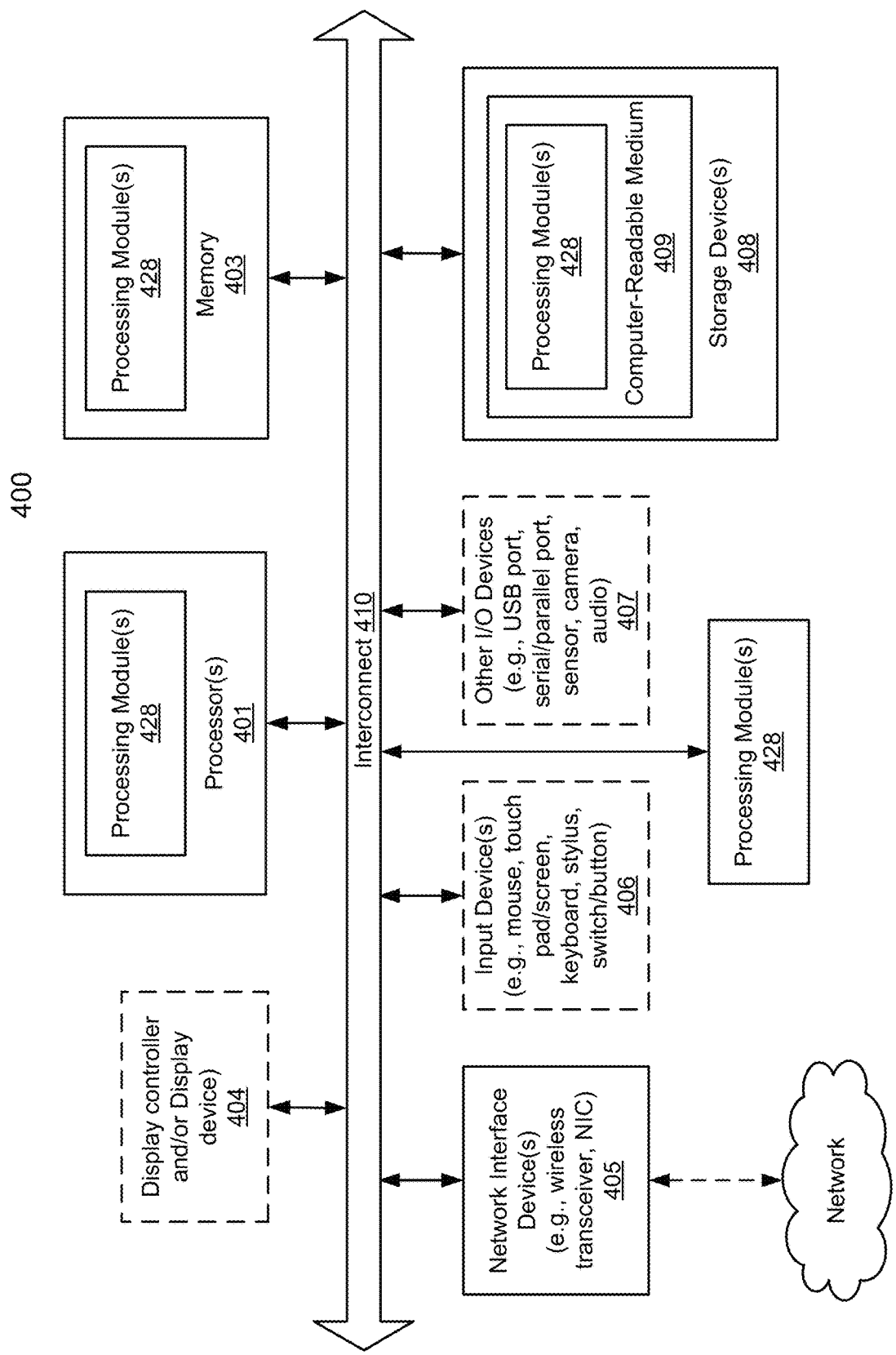
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing a distributed cache implemented by network inference controllers of data processing systems, the distributed cache providing cache services for data stored in storages that are remote to the data processing systems, the method comprising:
    obtaining, by a Network Interface Controller (NIC) of a data processing system of the data processing systems, a read request for a portion of data stored in one of the storages;
    performing, by the NIC, a lookup for the portion of the data in a portion of the distributed cache hosted by the NIC to obtain a lookup result;
    in a first instance where the lookup result indicates that the portion of the data is present in the portion of the distributed cache:
        providing the portion of the data using the portion of the distributed cache to service the read request;
    in a second instance where the lookup result indicates that the portion of the data is not present in the portion of the distributed cache:
        providing the portion of the data using the one of the storages to service the read request; and
    maintaining an accuracy of the portion of the distributed cache with respect to the portion of the data by processing a cache entry invalidation message originated by a second NIC of a second data processing system of the data processing systems.

2. The computer-implemented method of claim 1, wherein processing the cache entry invalidation message comprises:
    identifying a tuple specified by the cache entry invalidation message;
    identifying a sub-portion of the portion of the distributed cache based on the tuple; and
    invalidating a cache entry present in the sub-portion.

3. The computer-implemented method of claim 2, wherein the cache entry comprises a copy of the portion of the data.

4. The computer-implemented method of claim 3, wherein the tuple comprises:
    a volume identifier for the portion of the data;
    an offset for the portion of the data; and
    a size of the portion of the data.

5. The computer-implemented method of claim 1, wherein providing the portion of the data using the one of the storages to service the read request comprises:
    encapsulating information regarding the read request;
    transmitting the encapsulated information to the one of the storages via a communication system;
    receiving, via the communication system, the portion of the data via communication responsive to the transmitted encapsulated information; and providing, via a bus between the NIC and compute resources of the data processing system, the portion of the data to a hardware component of the compute resources.

6. The computer-implemented method of claim 5, wherein providing the portion of the data using the portion of the distributed cache to service the read request comprises:
reading the portion of the data from the portion of the distributed cache; and
providing, via the bus between the NIC and compute resources of the data processing system, the portion of the data to the hardware component of the compute resources.

7. The computer-implemented method of claim 6, wherein processing the cache entry invalidation message originated by the second NIC of the second data processing system of the data processing systems comprises:
receiving, via the communication system, the cache entry invalidation message from the second NIC or a cache management service.

8. The computer-implemented method of claim 1, wherein the distributed cache is not persistent, and respective portions of the distributed cache hosted by the data processing systems are refreshed when each the data processing systems restarts.

9. The computer-implemented method of claim 8, wherein each of the respective portions of the distributed cache stores copies of portions of the data that are relevant to data processing system that hosts corresponding portions of the distributed cache.

10. The computer-implemented method of claim 1, further comprising:
obtaining, by the NIC, a data storage request for a second portion of the data;
updating, by the NIC, the portion of the distributed cache based on the second portion of the data;
providing, by the NIC, the second portion of the data to the storages for storage; and
distributing, by the NIC, a second cache entry invalidation message for the second portion of the data to each other data processing system of the data processing systems that does not host the NIC.

11. The computer-implemented method of claim 10, wherein the second cache entry invalidation message does not include the second portion of the data.

12. The computer-implemented method of claim 11, wherein the second cache entry invalidation message comprises information usable by each other data processing system of the data processing systems to identify cache entries of the distributed cache hosted by each respective data processing system of the data processing systems that no longer accurately reflects the data stored in the storages.

13. A non-transitory machine-readable medium having instructions stored therein, which when executed by a processor, cause the processor to perform operations for managing a distributed cache implemented by network inference controllers of data processing systems, the distributed cache providing cache services for data stored in storages that are remote to the data processing systems, the operations comprising:
obtaining, by a Network Interface Controller (NIC) of a data processing system of the data processing systems, a read request for a portion of data stored in one of the storages;
performing, by the NIC, a lookup for the portion of the data in a portion of the distributed cache hosted by the NIC to obtain a lookup result;
in a first instance where the lookup result indicates that the portion of the data is present in the portion of the distributed cache:
providing the portion of the data using the portion of the distributed cache to service the read request;
in a second instance where the lookup result indicates that the portion of the data is not present in the portion of the distributed cache:
providing the portion of the data using the one of the storages to service the read request; and
maintaining an accuracy of the portion of the distributed cache with respect to the portion of the data by processing a cache entry invalidation message originated by a second NIC of a second data processing system of the data processing systems.

14. The non-transitory machine-readable medium of claim 13, wherein processing the cache entry invalidation message comprises:
identifying a tuple specified by the cache entry invalidation message;
identifying a sub-portion of the portion of the distributed cache based on the tuple; and
invalidating a cache entry present in the sub-portion.

15. The non-transitory machine-readable medium of claim 14, wherein the cache entry comprises a copy of the portion of the data.

16. The non-transitory machine-readable medium of claim 15, wherein the tuple comprises:
a volume identifier for the portion of the data;
an offset for the portion of the data; and
a size of the portion of the data.

17. A data processing system, comprising:
compute resources; and
a Network Interface controller (NIC), comprising:
a processor, and
a memory coupled to the processor to store instructions, which when executed by the processor, cause the processor to perform operations for managing a distributed cache implemented by network inference controllers of data processing systems, the distributed cache providing cache services for data stored in storages that are remote to the data processing systems, the operations comprising:
obtaining a read request for a portion of data stored in one of the storages;
performing a lookup for the portion of the data in a portion of the distributed cache hosted by the NIC to obtain a lookup result;
in a first instance where the lookup result indicates that the portion of the data is present in the portion of the distributed cache:
providing the portion of the data using the portion of the distributed cache to service the read request;
in a second instance where the lookup result indicates that the portion of the data is not present in the portion of the distributed cache:
providing the portion of the data using the one of the storages to service the read request; and
maintaining an accuracy of the portion of the distributed cache with respect to the portion of the data by processing a cache entry invalidation message originated by a second NIC of a second data processing system of the data processing systems.

18. The data processing system of claim 17, wherein processing the cache entry invalidation message comprises:
    identifying a tuple specified by the cache entry invalidation message;
    identifying a sub-portion of the portion of the distributed cache based on the tuple; and
    invalidating a cache entry present in the sub-portion.

19. The data processing system of claim 18, wherein the cache entry comprises a copy of the portion of the data.

20. The data processing system of claim 19, wherein the tuple comprises:
    a volume identifier for the portion of the data;
    an offset for the portion of the data; and
    a size of the portion of the data.

* * * * *